Jan. 20, 1925.
P. L. SCOTT
1,523,453
COMBUSTION CHAMBER FOR LIQUID FUEL ENGINES
Original Filed June 18, 1918
Fig. 1,
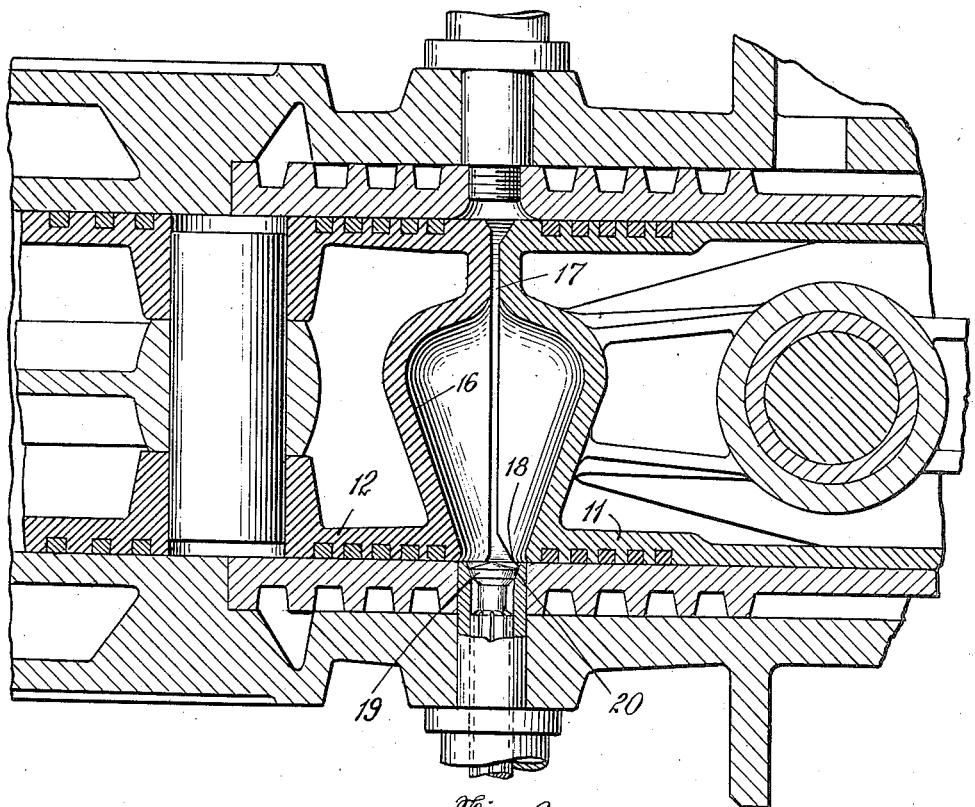
Fig. 2,
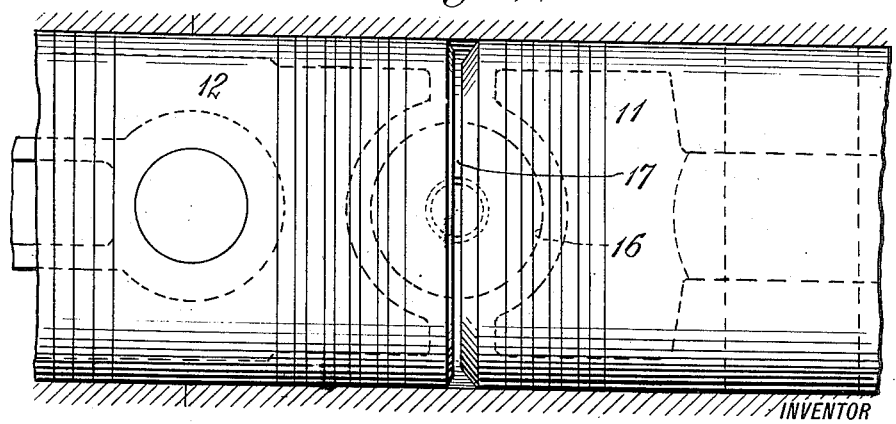
INVENTOR
Philip L. Scott,
BY
Pennie, Davis, Marvin & Edmonds,
ATTORNEYS.

Patented Jan. 20, 1925.

1,523,453

UNITED STATES PATENT OFFICE.

PHILIP LANE SCOTT, OF CHICAGO, ILLINOIS, ASSIGNOR TO SUPER-DIESEL TRACTOR CORPORATION, OF LAPORTE, INDIANA, A CORPORATION OF NEW YORK.

COMBUSTION CHAMBER FOR LIQUID-FUEL ENGINES.

Application filed June 18, 1918, Serial No. 240,709. Renewed May 26, 1921. Serial No. 472,891

*To all whom it may concern:*

Be it known that I, PHILIP LANE SCOTT, residing at Chicago, in the county of Cook and State of Illinois, have invented certain new and useful Improvements in Combustion Chambers for Liquid-Fuel Engines; and I do hereby declare the following to be a full, clear, and exact description of the invention, such as will enable others skilled in the art to which it appertains to make and use the same.

The present invention relates to improvements in internal combustion engines of the type in which a liquid fuel such as oil is injected under high pressure, into a combustion space between two pistons adapted to move simultaneously in opposite directions, the fuel being ignited by the high temperature of a charge of air which is highly compressed between the pistons prior to the supply of liquid fuel. More particularly, the present invention involves an improvement in the shape of the adjacent ends of the pistons and of the fuel spray, whereby there is formed a combustion chamber having a shape conforming closely to the shape of the spray of fuel supplied to the chamber, but which will prevent the fuel from directly striking the relatively hot surfaces of the pistons. In order to produce most effective combustion in an engine of this character, the injected fuel should lie close to the hot metallic surfaces of the pistons, but the fuel should not directly strike the hot surfaces because, if it does, cracking of the oil takes place and carbon is rapidly deposited, causing an increase of fuel consumption, a smoky exhaust from the engine, and other well-known disadvantages of carbon deposit in internal combustion engines.

The above objects of the present invention, as well as others which will appear more clearly hereinafter, are attained by giving to the opposed ends of the pistons a symmetrical contour, such that when the pistons are in juxtaposition as at the beginning of the working stroke, the combustion chamber has a shape which may be most conveniently described as that of a pear from its resemblance to such an object. While the larger end of the pear-shaped combustion space formed between the pistons when they are adjacent each other at their inward limits of movement, is almost closed by the ends of the pistons, the smaller end of the space is relatively open to permit entrance of the fuel which is supplied through a port in the side of the cylinder registering with the open end of the combustion chamber when the pistons are adjacent each other. The fuel is supplied in the form of a hollow conical spray in order that the greater amount of air will lie inside the spray and not between it and the piston head as is the case with certain prior constructions. The particular nature of the present invention will appear more clearly from a description of a preferred embodiment thereof, as shown in the accompanying drawings, in which Figure 1 is a view in section through the central portion of the cylinder showing the pistons adjacent each other, and Fig. 2 is an exterior view of the pistons as viewed from the top of Fig. 1.

Since the cylinder of the engine with which the improved pistons of the present invention are to be used, forms no part of the invention and may be of any preferred construction, it will not be described in detail. Within the cylinder are two hollow pistons 11 and 12, of which only the inner ends are shown in the drawing.

The adjacent heads of the pistons are formed with depressions as at 16 which are preferably symmetrical and of such contour as to give to the space bounded by the end walls of the pistons when they are adjacent each other, a pear shape. At the wider end of the combustion chamber, the ends of the pistons come relatively close to each other as indicated at 17. The smaller end of the combustion chamber is of circular form and of a size corresponding substantially to an aperture 18 in the wall of the cylinder and through which the liquid fuel is injected into the combustion space.

It is intended that the spray of fuel entering through the aperture 18 shall have a hollow conical form but spaced sufficiently from the walls of this chamber to prevent the fuel from actually coming into contact with the hot metal surfaces of the pistons. With the above form of fuel spray, the greater portion of the charge of air within the combustion space will lie within the film of fuel, so that as the pistons recede, the film will be continuously withdrawn from in front of the injection valve and fresh air will be brought into position to cause combustion of succeeding amounts of fuel supplied to the combustion chamber, which promotes the best mixing of air and fuel during the injection period and causes the most effective combustion. Such a hollow conical spray may be produced by a suitably coned valve as 19 co-operating with a coned valve seat as 20 to provide a flaring annular metal orifice of the proper inclination when the valve is opened.

While the combustion space formed in the ends of the pistons has been shown and described of general pear-shape, it will be understood that it may be given other configurations conforming to the general shape of the cone of fuel spray supplied to the combustion chamber.

It will be understood that injection of the fuel takes place at a time when the air in the cylinder is highly compressed between the two piston heads and the finely divided fuel is projected into an atmosphere where the pressure is high so that there is contained inside the hollow fuel cone a supply of air calculated to support combustion and this air is at high pressure. As burning commences and as the pistons recede the point at which the spray is discharged does not change but the compressed air expands and follows the pistons passing through the cone. There is therefore a travel of high compressed air along lines intercepting the wall of the cone of fuel and this lends itself to satisfactory commingling of fuel and air and permits the products of combustion being on the outside to pass away from the immediate point at which the spray contacts the pure air and at which combustion takes place. This movement of the air is most pronounced in a direction parallel with the cylinder axis but there is such a movement also in a direction perpendicular to said axis caused by the fact that the pear-shaped combustion chamber is in every dimension smaller than the cylinder diameter.

It will be noted that the same effect of drawing or forcing the compressed air through a film or sheet of finely divided fuel would be observed if one of the cylinders were stationary and while my arrangement with the two moving pistons is the most satisfactory one my invention is not limited to the two cylinders and any mechanism which provides for a sheet of spray of fuel being discharged into a combustion chamber and intercepting a moving current of air would fall under my invention.

I claim:

1. In an internal combustion engine, a cylinder, a pair of oppositely movable pistons therein, an injection valve in the wall of the cylinder through which fuel is supplied in the form of a hollow spray between the adjacent ends of the pistons, the adjacent ends of said pistons being provided with symmetrical depressions forming a combustion chamber conforming substantially to the shape of the hollow spray.

2. In an internal combustion engine, a cylinder, a pair of oppositely movable pistons therein, an injection valve in the wall of the cylinder through which fuel is supplied in the form of a hollow conical spray between the adjacent ends of the pistons, the adjacent ends of said pistons being provided with symmetrical depressions forming a combustion chamber conforming substantially to the shape of the cone of fuel supplied by said valve.

3. In an internal combustion engine, a cylinder and a pair of oppositely movable pistons therein, said pistons having their adjacent ends provided with depressions which when the pistons are in juxtaposition form a substantially pear-shaped combustion space and an injection valve in the wall of said cylinder registering with the smaller end of the combustion space when the pistons are adjacent each other and through which fuel is supplied to the combustion space in the form of a hollow spray substantially conforming to the pear shape of the combustion chamber.

4. In an internal combustion engine, a cylinder and a pair of oppositely movable pistons therein, said pistons having their adjacent ends provided with depressions which, when the pistons are in juxtaposition, form a substantially pear-shaped cumbustion space terminating at its smaller end in a circular aperture, and a fuel injection valve in the wall of the cylinder registering with the circular end of the combustion space, said valve comprising a conical head and a correspondingly tapered seat for the head, having substantially the same inclination as the adjacent walls of the combustion space but of lesser diameter, so that fuel may be injected into the combustion space parallel to but spaced from the walls thereof and in the form of a hollow conical spray.

5. In an internal combustion engine, a cylinder, a pair of oppositely movable pistons therein, the adjacent ends of said pistons being provided with opposed depressions adapted, when the pistons are in juxtaposition, to form a combustion chamber, an injection valve in the wall of the cylinder through which the fuel is supplied, adapted to direct a hollow spray into said combustion chamber without contacting the walls thereof.

6. In an internal combustion engine a cylinder, a pair of oppositely movable pistons therein the adjacent ends of said pistons being provided with opposed depressions adapted to form a combustion chamber, an injection valve in the wall of the cylinder through which fuel is supplied adapted to direct the fuel into said combustion chamber, and to enclose within the hollow fuel cone formed during injection a body of compressed air, which air is free to expand outwardly through the fuel cone when the pistons separate.

7. The process of burning fuel in an internal combustion engine which consists in discharging into a combustion zone containing air under pressure a hollow cone of finely divided fuel in such manner as to enclose substantially all said compressed air within the cone and then as combustion takes place expanding said compressed air through said cone.

8. The process of burning fuel in an internal combustion engine which consists in discharging into a combustion zone containing air under pressure a hollow cone of finely divided fuel in such manner as to enclose substantially all said compressed air within the cone and then as combustion takes place expanding the compressed air through said cone and continuing the discharge of such conical fuel cone during the expansion and combustion of the air until the process is completed.

In testimony whereof I affix my signature.

PHILIP LANE SCOTT.